(12) United States Patent
Schmidt et al.

(10) Patent No.: US 10,610,074 B2
(45) Date of Patent: Apr. 7, 2020

(54) SENSOR CLEANING APPARATUS

(71) Applicant: Ford Global Technologies, LLC, Dearborn, MI (US)

(72) Inventors: David Schmidt, Dearborn, MI (US); Scott A. Black, Farmington Hills, MI (US)

(73) Assignee: Ford Globlal Technologies, LLC, Dearborn, MI (US)

( * ) Notice: Subject to any disclaimer, the term of this patent is extended or adjusted under 35 U.S.C. 154(b) by 267 days.

(21) Appl. No.: 15/641,406

(22) Filed: Jul. 5, 2017

(65) Prior Publication Data
US 2019/0008345 A1 Jan. 10, 2019

(51) Int. Cl.
| | | |
|---|---|---|
| *A47L 9/08* | (2006.01) | |
| *A47L 9/28* | (2006.01) | |
| *G05D 1/02* | (2020.01) | |
| *B08B 5/02* | (2006.01) | |
| *A47L 9/04* | (2006.01) | |

(52) U.S. Cl.
CPC ............... *A47L 9/08* (2013.01); *A47L 9/2805* (2013.01); *A47L 9/2842* (2013.01); *A47L 9/2847* (2013.01); *B08B 5/02* (2013.01); *G05D 1/0227* (2013.01); *A47L 9/0488* (2013.01); *G05D 1/0238* (2013.01); *G05D 2201/0203* (2013.01)

(58) Field of Classification Search
CPC ........ A47L 9/08; A47L 9/2805; A47L 9/2815; A47L 5/14; A47L 5/02; B23Q 11/005; G05D 2201/0203; G05D 1/0238; G05D 1/0227; B60S 1/56; B60S 1/54; B60S 1/603; B60S 1/606; B60S 1/0848; G02B 27/006; G01N 21/15; G01N 2021/151; G01D 2013/9382; G01S 7/4813; G01S 2007/4975; B05B 7/0815; B08B 17/02; B08B 5/00; B08B 5/02; B08B 1/005; B08B 3/02; B08B 3/024; B60R 11/04; B60R 1/0602; G08B 13/18
USPC ................. 15/300.1, 313, 250.001, 350.002, 15/350.003, 405; 239/284.1, 284.2
See application file for complete search history.

(56) References Cited

U.S. PATENT DOCUMENTS

| | | | |
|---|---|---|---|
| 6,890,080 B2 * | 5/2005 | Kalley | G01J 5/02 359/509 |
| 7,495,747 B2 | 2/2009 | Yoshida et al. | |
| 8,857,775 B1 * | 10/2014 | Clearman | G03B 17/561 24/334 |
| 10,073,178 B2 * | 9/2018 | Hara | G01S 7/4813 |
| 10,220,817 B2 * | 3/2019 | Rice | B60S 1/56 |
| 10,252,703 B2 * | 4/2019 | Ina | B60S 1/522 |
| 2006/0068696 A1 | 3/2006 | Ashford et al. | |
| 2012/0162428 A1 | 6/2012 | Wee | |

(Continued)

FOREIGN PATENT DOCUMENTS

| | | | |
|---|---|---|---|
| CN | 203920685 U | 11/2014 | |
| EP | 2605043 A1 | 6/2013 | |
| WO | WO-2004010838 A2 * | 2/2004 | ............ A47L 25/00 |

*Primary Examiner* — Joseph J Hail
*Assistant Examiner* — Robert F Neibaur
(74) *Attorney, Agent, or Firm* — Frank A. MacKenzie; Bejin Bieneman PLC (57) ABSTRACT

An assembly includes a sensor arm extensible from a pillar of a vehicle, a sensor and a sensor window each attached to the sensor arm, a blower positioned between the sensor window and the pillar, and a duct extending from the blower to direct airflow from the blower across the sensor window.

19 Claims, 5 Drawing Sheets

(56) References Cited

U.S. PATENT DOCUMENTS

2014/0117701 A1\* 5/2014 Davis .................. A42B 3/26
                                                296/96.15
2016/0209645 A1   7/2016  Britton
2016/0244028 A1   8/2016  Wakatsuki
2016/0311405 A1  10/2016  Richardson et al.

\* cited by examiner

SENSOR CLEANING APPARATUS

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

An assembly includes a sensor arm extensible from a pillar of a vehicle, a sensor and a sensor window each attached to the sensor arm, a blower positioned between the sensor window and the pillar, and a duct extending from the blower to direct airflow from the blower across the sensor window.

The sensor window may be cylindrical. The sensor window may define an axis, and the duct may direct the airflow parallel to the axis. The duct may have an opening extending along an arc of a circle centered on the axis. The opening may be positioned to create an air curtain across the sensor window when the blower is operating. The opening may extend at least 180° about the axis. The opening may have a width that is substantially constant along the arc of the circle. The opening may extend parallel to the axis from an entrance end to an exit end, and the width of the opening may be narrower at the exit end than at the entrance end.

The duct may have a plurality of nozzles each positioned on a circle centered on the axis.

The axis may be a first axis, and the blower may include an impeller rotatable about a second axis parallel to the first axis. The duct may define a passage through which the blower directs the airflow, and the passage may extend from above the blower to above the sensor window. The passage may include a first circular passage disposed above the impeller and a second circular passage above the sensor window. A diameter of the first circular passage may be at least as great as a diameter of the impeller, and a diameter of the second circular passage may be at least as great as a diameter of the sensor window. The passage may include a connecting passage extending from the first circular passage to the second circular passage. A width of the connecting passage may be narrower than the diameter of the first circular passage and narrower than the diameter of the second circular passage.

The assembly may include the pillar of the vehicle. The pillar may extend from a first end at a bottom of a windshield to a second end at a top of the windshield, and the sensor arm may be attached to the pillar spaced from the first end and from the second end. The assembly may include the windshield.

The blower may include an inlet, and the assembly may further include a channel extending through the sensor arm and connected to the inlet. The assembly may include a filter positioned across the inlet.

The cleaning system described herein cleans a vehicle sensor and may thus allow the sensor to more accurately detect the external environment. The sensor is positioned relative to the rest of the vehicle so as to not cause significant drag or increase a height of the vehicle by being located on a roof of the vehicle, while still maintaining a wide field of view for the sensor. The cleaning system is positioned relative to the rest of the vehicle so that the cleaning system will not block the field of view of the sensor nor of a human driver of the vehicle who is looking through the windshield or a window of the vehicle.

Figure 1:
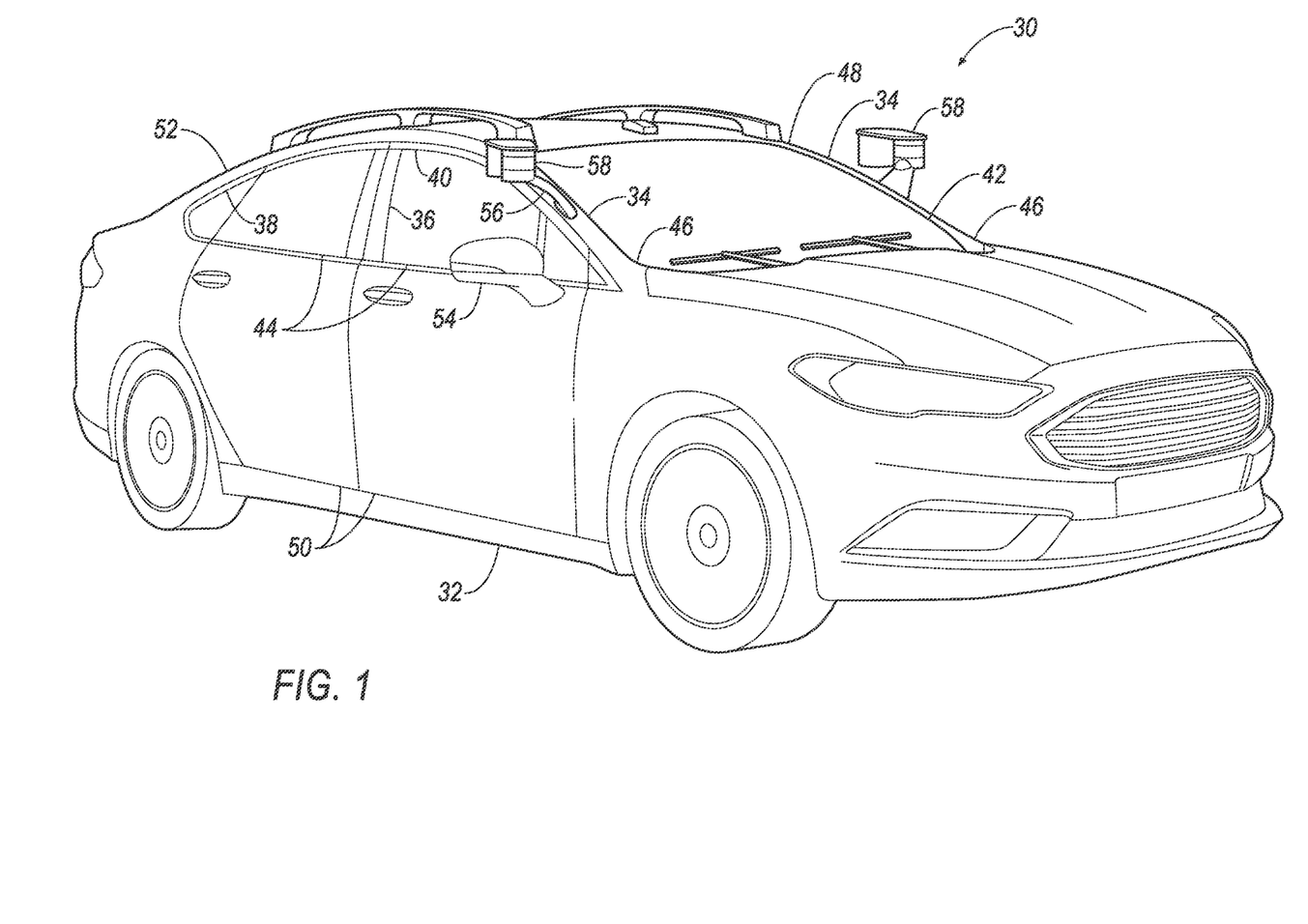
FIG. 1 is a perspective view of an example vehicle.
Figure 2:
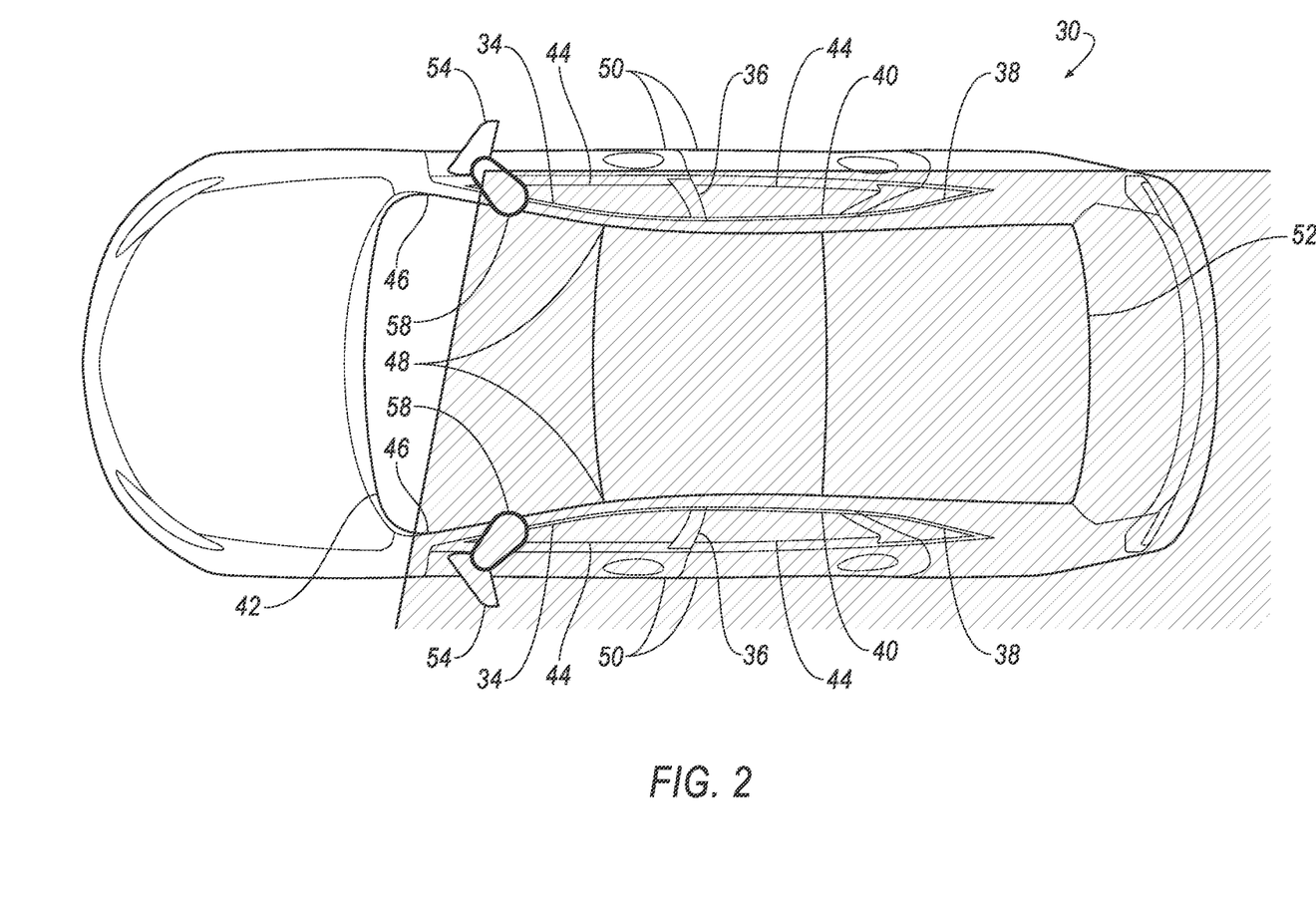
FIG. 2 is a top view of the vehicle.

With reference to FIGS. 1 and 2, a body 32 of a vehicle 30 may include A pillars 34, B pillars 36, C pillars 38, and roof rails 40. The A pillars 34 may extend between a windshield 42 and windows 44 and from a first end 46 at a bottom of the windshield 42 to a second end 48 at a top of the windshield 42. (The adjectives "first" and "second" are used throughout this document as identifiers and are not intended to signify importance or order.) The B pillars 36 may extend between the windows 44 of adjacent doors 50. The C pillars 38 may extend between the windows 44 and a backlite 52. The body 32 may also include D pillars (not shown) if the vehicle 30 is, e.g., an SUV, crossover, minivan, or station wagon, in which case the C pillars 38 extend between the windows 44 of rear doors 50 and rear left and right windows 44, and the D pillars extend between the rear right and left windows 44 and the backlite 52. The roof rails 40 extend along the windows 44 from the A pillar 34 to the B pillar 36 to the C pillar 38.

The windshield 42, windows 44, and backlite 52 may be formed of any suitably durable transparent material, including glass such as laminated, tempered glass or plastic such as Plexiglas or polycarbonate. The windshield 42 is located adjacent the A pillars 34.

With continued reference to FIGS. 1 and 2, the vehicle 30 may include side-view mirrors 54. The side-view mirrors 54 may be located on the front doors 50 or on the body 32 near the bottom of the windshield 42. The side-view mirrors 54 may be visible to a human driver through the windows 44 and provide a reflected view of a vehicle-rearward direction to the driver.

Figure 3:
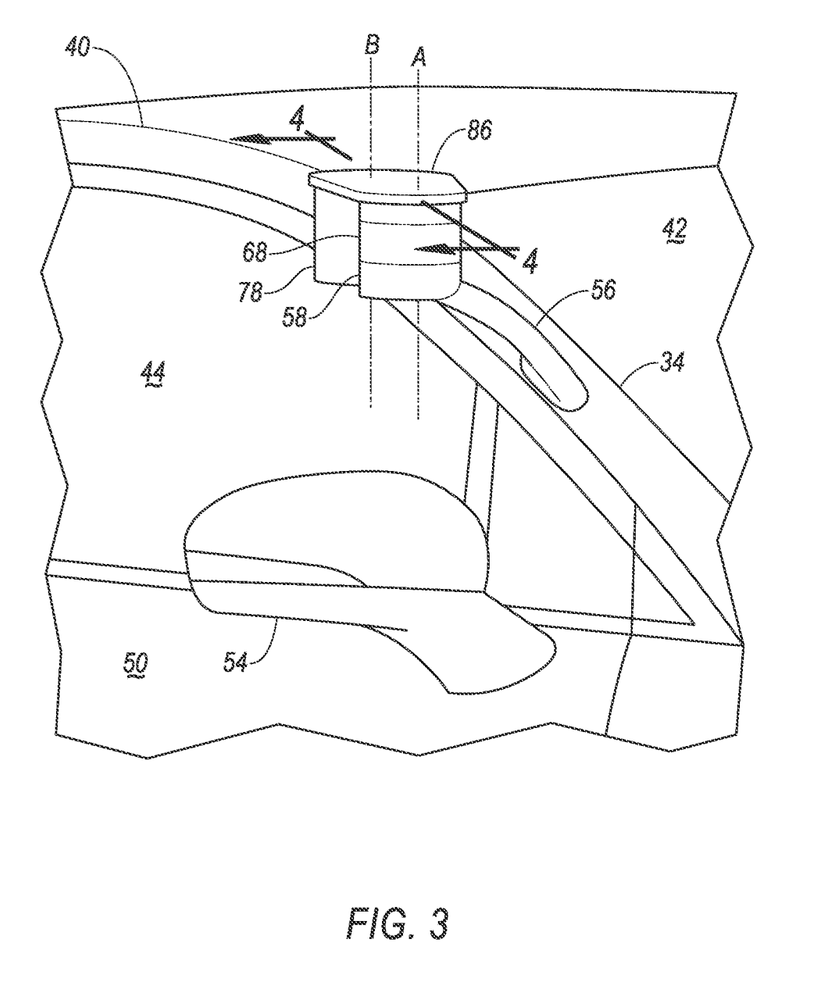
FIG. 3 is a perspective view of a sensor assembly of the vehicle.
Figure 4:
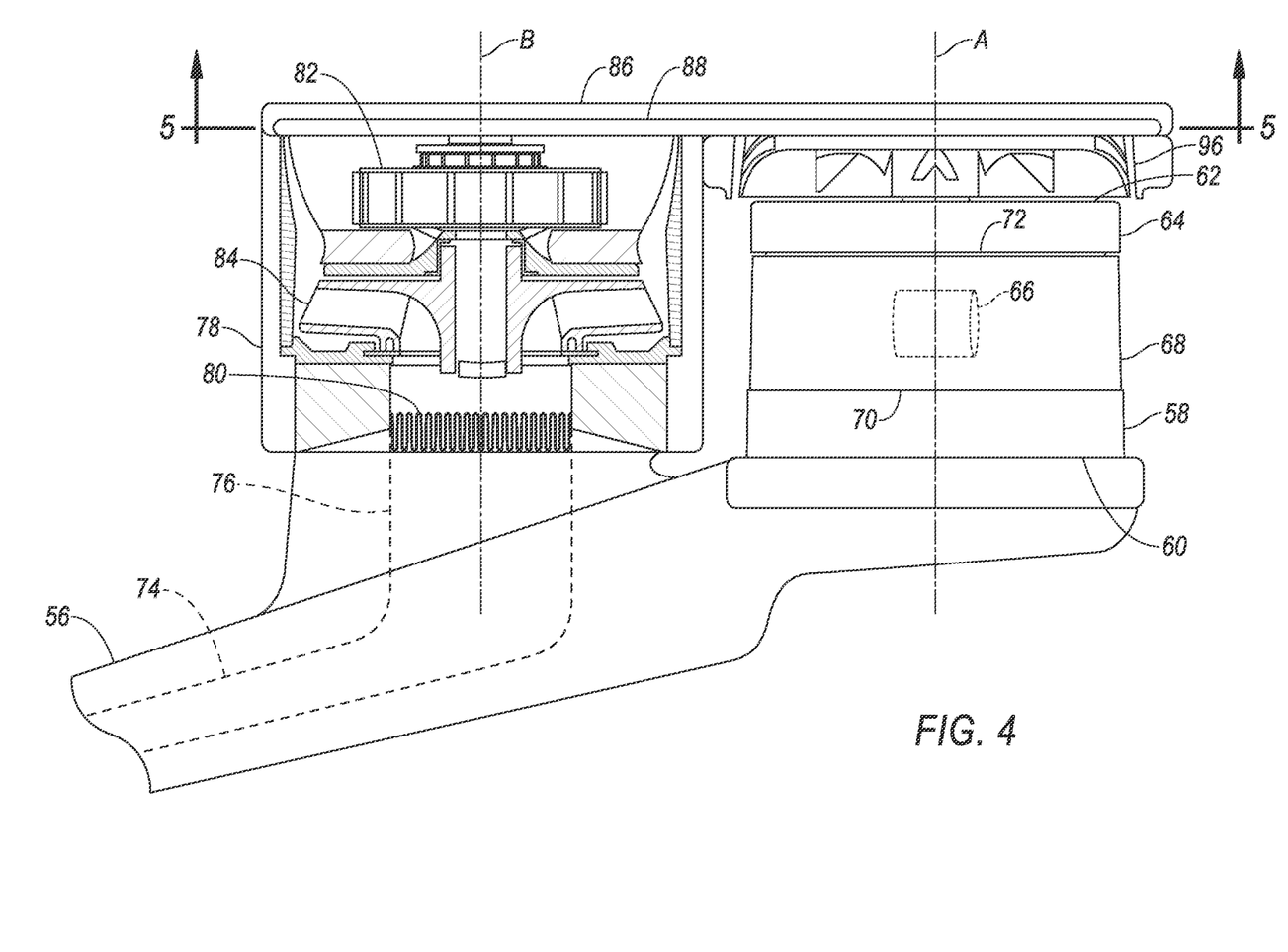
FIG. 4 is a cross-sectional view of the sensor assembly.

With reference to FIGS. 1, 3, and 4, a sensor arm 56 extends from one of the pillars 34, 36, 38 of the vehicle 30, e.g., the A pillar 34, to a sensor housing 58. The sensor arm 56 may be located between the ends 46, 48 of the A pillar 34, that is, spaced from the bottom of the windshield 42 and from the top of the windshield 42, that is, spaced from the first end 46 and from the second end 48. The sensor arm 56 may be attached to a bottom surface 60 of the sensor housing 58. The sensor arm 56 may have a tubular or other hollow shape, that is, a cavity may extend through the sensor arm

56. The cavity may allow wiring, tubes, etc. to pass through the sensor arm 56 while being shielded from the outside environment.

With reference to FIGS. 3 and 4, the sensor housing 58 is supported by the sensor arm 56. The sensor housing 58 may have a cylindrical shape with a top surface 62, the bottom surface 60, and a side surface 64. The top surface 62 faces up, that is, in a vehicle-upward direction, and the bottom surface 60 faces down, that is, in a vehicle-downward direction. The side-view mirrors 54 may be located below the sensor housings 58, that is, in a vehicle-downward direction from the sensor housings 58, and each bottom surface 60 may face each side-view mirror 54. The cylindrical shape of the sensor housing 58 defines the axis A, which runs through a center of the sensor housing 58. The axis A is oriented vertically relative to the vehicle 30.

With reference to FIG. 3, a sensor 66 is disposed inside the sensor housing 58 and is attached to and supported by the sensor arm 56. The sensor 66 may be designed to detect features of the outside world; for example, the sensor 66 may be a radar sensor, a scanning laser range finder, a light detection and ranging (LIDAR) device, or an image processing sensor such as a camera. In particular, the sensor 66 may be a LIDAR device. A LIDAR device detects distances to objects by emitting laser pulses at a particular wavelength and measuring the time of flight for the pulse to travel to the object and back.

With reference to FIGS. 3 and 4, the side surface 64 may include a sensor window 68. The sensor window 68 is supported by and attached to the sensor arm 56. The sensor window 68 may be cylindrical and may also define the axis A. The sensor window 68 extends about the axis A. The sensor window 68 may extend fully about the axis A, that is, 360°, or partially about the axis A. The sensor window 68 extends along the axis A from a bottom edge 70 to a top edge 72. The bottom edge 70 may be at the bottom surface 60 or may be spaced from the bottom surface 60 along the side surface 64. The top edge 72 may be at the top surface 62 or may be spaced from the top surface 62 along the side surface 64. The sensor window 68 has a diameter. The diameter of the sensor window 68 may be the same as the rest of the side surface 64, if any; in other words, the sensor window 68 may be flush or substantially flush with the side surface 64. "Substantially flush" means a seam between the sensor window 68 and the rest of the side surface 64 does not cause turbulence in air flowing along the side surface 64. At least some of the sensor window 68 is transparent with respect to whatever medium the sensor 66 is capable of detecting. For example, if the sensor 66 is a LIDAR device, then the sensor window 68 is transparent with respect to visible light at the wavelength generated by the sensor 66.

With reference to FIG. 2, the sensor window 68 has an obstructed portion and a viewing portion. The obstructed portion faces the vehicle 30, and the viewing portion faces away from the vehicle 30. In other words, the obstructed portion is the area of the sensor window 68 for which the sensor 66 is blocked by the vehicle 30 from detecting the external environment. The viewing portion is the area of the sensor window 68 through which the sensor 66 is able to detect the external environment without obstruction by the vehicle 30. If the sensor arm 56 extends from between the ends 46, 48 of the A pillar 34, as shown in FIG. 1, then the viewing portion may be approximately equal to or greater than 270°.

With reference to FIG. 4, a channel 74 extends through the sensor arm 56 and is connected to an inlet 76 of a blower 78. The channel 74 is distinct from the cavity of the sensor arm 56 described above. The channel 74 may be connected to a passenger cabin of the vehicle 30; in other words, air may flow from the passenger cabin to the channel 74. The channel 74 may provide a path for airflow from the passenger cabin to the inlet 76.

The blower 78 is positioned between the sensor window 68 and the A pillar 34. "Positioned between," for the purposes of this disclosure, means that a straight line from the sensor window 68 to the A pillar 34 intersects the blower 78. More specifically, the blower 78 may be laterally positioned between the sensor window 68 and the A pillar 34, i.e., a horizontal straight line from the sensor window 68 to the A pillar 34 intersects the blower 78. The blower 78 may include the inlet 76, an air filter 80, a drive motor 82, and an impeller 84 rotatably coupled to the drive motor 82. Specifically, the drive motor 82 and/or the impeller 84 may be positioned between the sensor window 68 and the A pillar 34. The blower 78 may be a centrifugal fan (as shown in FIG. 4), an axial-flow fan, a cross-flow fan, or any other type of fan.

The inlet 76 leads from the channel 74 to the impeller 84. The inlet 76 may be a passageway, e.g., a tube. The inlet 76 may face downward.

The inlet 76 may contain the air filter 80. The air filter 80 may be positioned across the inlet 76, i.e., may cover a cross-section of the inlet 76 so that air cannot pass around the air filter 80 through the inlet 76. The air filter 80 may be formed of fibrous materials that remove solid particulates, e.g., dust, smog, pollen, etc., from the air.

The impeller 84 has vanes that, when the impeller 84 is rotated by the drive motor 82, pull air from the inlet 76 and push air toward a duct 86. The impeller 84 may be rotatable about a second axis B. The second axis B may be parallel to the axis A.

With continued reference to FIG. 4, the drive motor 82 may be coupled to the sensor arm 56 and to the impeller 84. The drive motor 82 may be fixed to the sensor arm 56, for example, by fastening. The drive motor 82 may be disposed above or below the impeller 84. The drive motor 82 may be, for example, an electric motor having a rotational output.

Figure 5A:
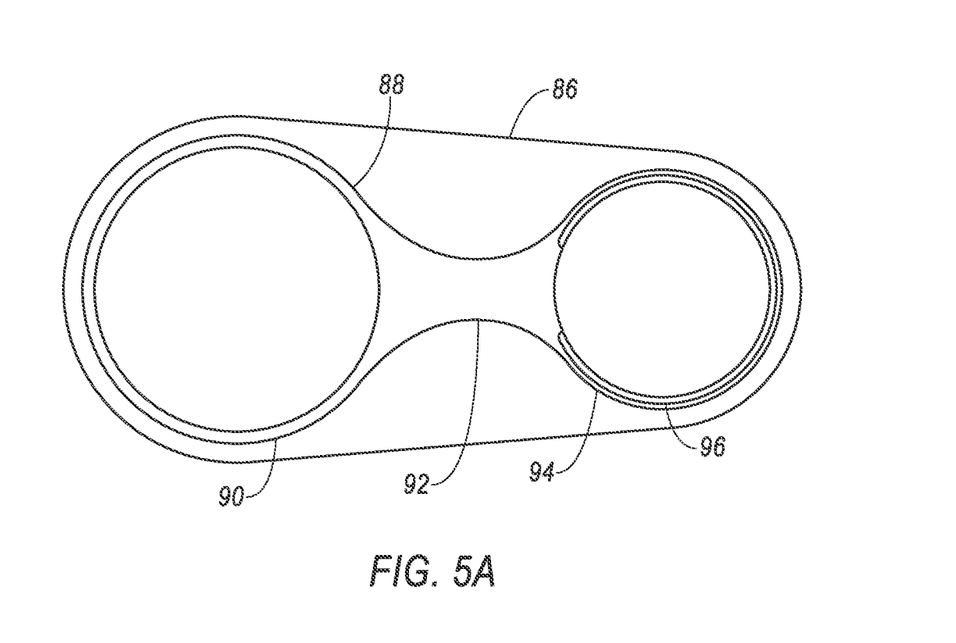
FIG. 5A is a cross-sectional view of a first example of a duct of the sensor assembly.
Figure 5B:
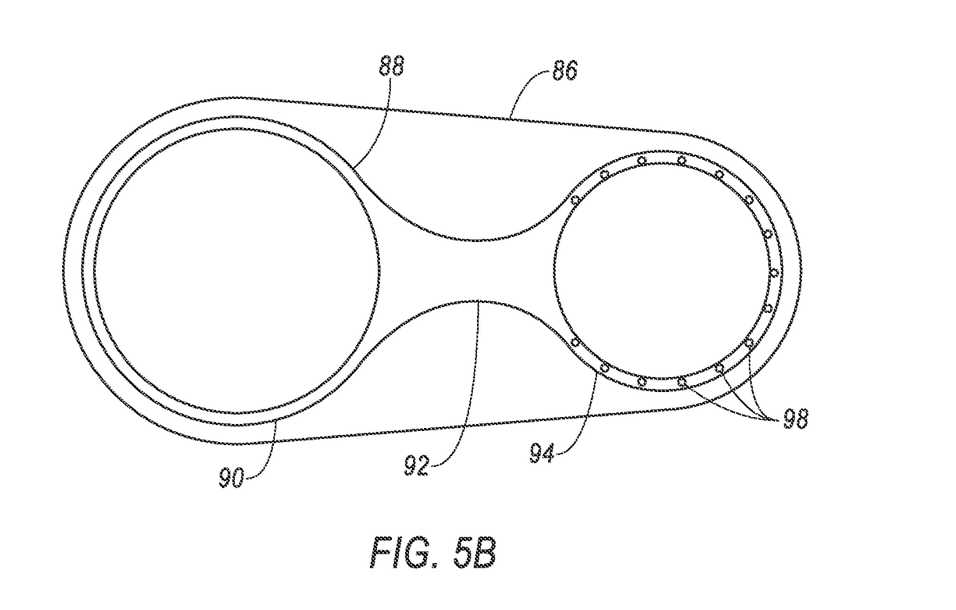
FIG. 5B is a cross-sectional view of a second example of the duct.

With reference to FIGS. 4-5B, the duct 86 extends from the blower 78 to direct airflow from the blower 78 across the sensor window 68. The duct 86 defines a passage 88 through which the blower 78 directs the airflow. The passage 88 extends from above the blower 78 to above the sensor window 68. The impeller 84 directs airflow upward to the duct 86, and the duct 86 directs the airflow horizontally from above the blower 78 to above the sensor window 68. The duct 86 then directs the airflow downward across the sensor window 68, i.e., parallel to the axis A.

The passage 88 may include a first circular passage 90, a connecting passage 92, and a second circular passage 94. The first circular passage 90 is disposed above the impeller 84. A diameter of the first circular passage 90 is at least as great as a diameter of the impeller 84. The first circular passage 90 may have a ring shape, as shown in FIGS. 5A-B, with the first circular passage 90 extending about a solid circle, or the first circular passage 90 may have a circular shape with no solid center. The connecting passage 92 extends from the first circular passage 90 to the second circular passage 94. A width of the connecting passage 92 may be narrower than the diameter of the first circular passage 90 and narrower than a diameter of the second circular passage 94. The second circular passage 94 is disposed above the sensor window 68. The diameter of the second circular passage 94 is at least as great as the diameter of the sensor window 68. The second circular passage 94 may have a ring shape, as shown in FIGS. 5A-B, with the second circular passage 94 extending about a solid circle, or the second circular passage 94 may have a circular shape with no solid center.

With continued reference to FIGS. 4-5B, the duct 86 includes at least one pathway for directing airflow downward across the sensor window 68. Specifically, the pathway(s) may create an air curtain across the sensor window 68 when the blower 78 is operating.

With reference to FIG. 5A, in a first example of the pathway(s), the duct 86 may have an opening 96 extending along an arc of a circle centered on the axis A. An "arc of a circle" should be understood according to its plain and ordinary meaning, i.e., a connected section of a circumference of a circle, i.e., a partial circle. The opening 96 may extend fully about the axis A, i.e., 360°, or the opening 96 may extend partially about the axis A. For example, the opening 96 may extend at least 180° about the axis A. The opening 96 has the width that may be substantially constant circumferentially, i.e., along the arc of the circle; thus, difference in air flow through the opening 96 at different points about the circle is negligible. The opening 96 extends parallel to the axis from an entrance end at the second circular passage 94 to an exit end. The width of the opening 96 may be narrower at the exit end than at the entrance end. The opening 96 is positioned to create an air curtain across the sensor window 68 when the blower 78 is operating. An "air curtain" is a layer of moving air. In other words, the airflow from the opening 96 travels vertically across the sensor window 68 and substantially covers, that is, covers most of, the sensor window 68 or the viewing portion of the sensor window 68. "Across" means from one side of something to the other side. The air curtain serves as a barrier and may deflect debris or other potential obstructions from contacting the sensor window 68.

With reference to FIG. 5B, in a second example of the pathway(s), the duct 86 may have a plurality of nozzles 98 each positioned on a circle centered on the axis A. The nozzles 98 may be spaced circumferentially about the sensor housing 58. The nozzles 98 may be spaced evenly about the axis A or partially about the axis A, or the nozzles 98 may be more closely spaced on a vehicle-forward (i.e., facing a front of the vehicle) side of the sensor housing 58 than on a vehicle-rearward (i.e., facing a rear of the vehicle) side of the sensor housing 58. The nozzles 98 may be positioned to create an air curtain across the sensor window 68 when the blower 78 is operating. In other words, the airflow from the nozzles 98 travels vertically across the sensor window 68, that is, from the top edge 72 to the bottom edge 70, and substantially covers the sensor window 68 or the viewing portion of the sensor window 68.

When the vehicle 30 is in operation, the drive motor 82 drives the blower 78. The impeller 84 pulls air through the inlet 76 and the air filter 80 from the passenger cabin and pushes the air into the duct 86. The air travels through the passage 88 from the first circular passage 90 to the connecting passage 92 to the second circular passage 94 to the opening 96. The opening 96 directs the air across the sensor window 68. The continuous airflow may deflect dirt, particles, etc. from contacting the sensor window 68, keeping the sensor window 68 clear and facilitating the operation of the sensor 66.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a pillar of a vehicle;
a sensor arm extending from the pillar;
a sensor and a sensor window each attached to the sensor arm;
a blower positioned directly between the sensor window and the pillar along a horizontal line from the sensor window to the pillar; and
a duct extending from the blower to direct airflow from the blower across the sensor window.

2. The assembly of claim 1, wherein the sensor window is cylindrical.

3. The assembly of claim 2, wherein the sensor window defines an axis, and the duct directs the airflow parallel to the axis.

4. The assembly of claim 3, wherein the duct has an opening extending along an arc of a circle centered on the axis.

5. The assembly of claim 4, wherein the opening is positioned to create an air curtain across the sensor window when the blower is operating.

6. The assembly of claim 4, wherein the opening extends at least 180° about the axis.

7. The assembly of claim 4, wherein the opening has a width in a radial direction relative to the axis, and the width is constant along the arc of the circle.

8. The assembly of claim 7, wherein the opening extends parallel to the axis from an entrance end to an exit end, and the width of the opening is narrower at the exit end than at the entrance end.

9. The assembly of claim 3, wherein the duct has a plurality of nozzles each positioned on a circle centered on the axis.

10. The assembly of claim 3, wherein the axis is a first axis, and the blower includes an impeller rotatable about a second axis parallel to the first axis.

11. The assembly of claim 10, wherein the duct defines a passage through which the blower directs the airflow, the passage extending from above the blower to above the sensor window.

12. The assembly of claim 11, wherein the passage includes a first circular passage disposed above the impeller and a second circular passage above the sensor window.

13. The assembly of claim 12, wherein a diameter of the first circular passage is at least as great as a diameter of the impeller, and a diameter of the second circular passage is at least as great as a diameter of the sensor window.

14. The assembly of claim 13, wherein the passage includes a connecting passage extending from the first circular passage to the second circular passage.

15. The assembly of claim 14, wherein a width of the connecting passage is narrower than the diameter of the first circular passage and narrower than the diameter of the second circular passage.

16. The assembly of claim 1, wherein the pillar extends from a first end at a bottom of a windshield to a second end at a top of the windshield, and the sensor arm is attached to the pillar spaced from the first end and from the second end.

17. The assembly of claim 16, further comprising the windshield.

18. The assembly of claim 1, wherein the blower includes an inlet, the assembly further comprising a channel extending through the sensor arm and connected to the inlet.

19. The assembly of claim 18, further comprising a filter positioned across the inlet.

\* \* \* \* \*